United States Patent [19]

Auer

[11] Patent Number: 4,552,613

[45] Date of Patent: Nov. 12, 1985

[54] APPARATUS FOR PRODUCING POUCH PACKAGES IN PAIRS

[75] Inventor: Hugo Auer, Schwaz, Australia

[73] Assignee: Robert Bosch GmbH, Stuttgart, Fed. Rep. of Germany

[21] Appl. No.: 584,352

[22] Filed: Feb. 28, 1984

[30] Foreign Application Priority Data

Apr. 8, 1983 [DE] Fed. Rep. of Germany ....... 3312653

[51] Int. Cl.$^4$ .............................................. B32B 31/18
[52] U.S. Cl. ...................................... 156/515; 53/477; 53/547; 53/550; 53/551; 53/552; 53/553; 53/554; 53/555; 156/218; 156/251; 156/466
[58] Field of Search ............... 156/218, 251, 466, 515; 53/152, 154, 451, 469, 477, 479, 547, 548, 550, 551, 552, 553, 554, 555; 493/189, 194, 199, 203, 205, 206, 209, 288, 289

[56] References Cited

U.S. PATENT DOCUMENTS

| 1,986,422 | 1/1935 | Zwoyer ................................. 53/551 |
| 2,432,373 | 12/1947 | Bleam et al. ......................... 53/551 |
| 3,082,586 | 3/1963 | Schneider et al. .................... 53/552 |

*Primary Examiner*—Caleb Weston
*Attorney, Agent, or Firm*—Edwin E. Greigg

[57] ABSTRACT

The apparatus for producing pouch packages in pairs has two tube shaping devices disposed beside one another and two crosswise closure devices. To prevent having to stop both tubular pouch shaping devices at the same time in the event of an interruption or malfunction, or when changing a roll of packaging material, the crosswise closure devices are disposed on separate carriers. The carriers which are movable up and down individually can be coupled with a reciprocating element, which is moved incrementally up and down by a drive mechanism.

10 Claims, 2 Drawing Figures

APPARATUS FOR PRODUCING POUCH PACKAGES IN PAIRS

BACKGROUND OF THE INVENTION

The apparatus is based on an apparatus for producing pouch packages in pairs. In a tubular pouch making apparatus known for example from German Offenlegungsschrift No. 15 86 118, both crosswise closure devices are disposed on a common carrier that is movable up and down by the drive mechanism. The result of this arrangement is that if there is an interruption or malfunction in one of the two tubular pouch shaping devices, or if a new strip of packaging material is to be placed in the machine, both tubular pouch shaping devices must be stopped. A tubular pouch making apparatus in which both tubular pouch shaping devices can be operated independently of each other is accordingly desirable.

OBJECT AND SUMMARY OF THE INVENTION

The apparatus for producing pouch packages in pairs according to the invention has a greater production capacity than known machines of this kind. The increased productivity is expressed not only in the fact that during an interruption of one tubular pouch shaping device, the non-interrupted device continues to operate, but also, and quite particularly, in the avoidance of recurrent starting up and stopping of the entire machine, which experience has shown is required after a shutdown of one pouch making element. A further advantage is that the danger of malfunctions while shutting down and starting up again is reduced. A still further advantage is that the production of pouch packages that have poorly welded seams or are empty, which generally occurs each time the apparatus is restarted, is greatly reduced. Accordingly, the further advantage of reduced consumption of packaging material is attained.

The invention will be better understood and further objects and advantages thereof will become more apparent from the ensuing detailed description of a preferred embodiment, taken in conjunction with the drawings.

DESCRIPTION OF THE PREFERRED EMBODIMENT

Figure 1:
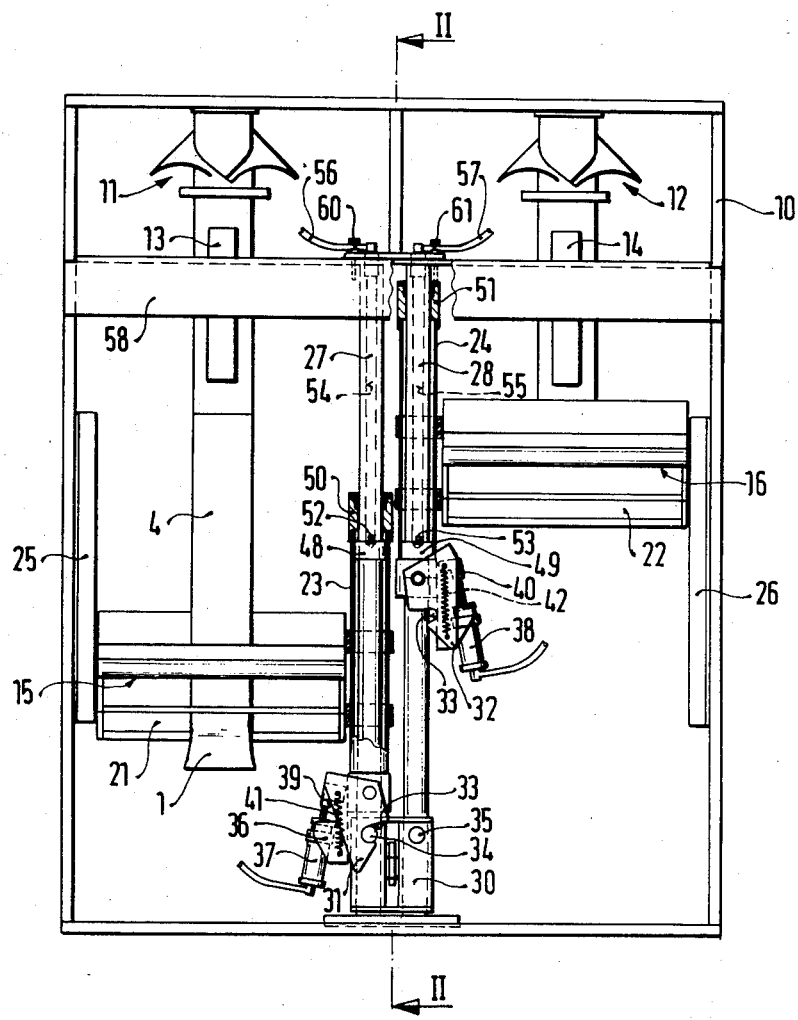
FIG. 1 shows a tubular pouch making apparatus in a front view, partially in section.
Figure 2:
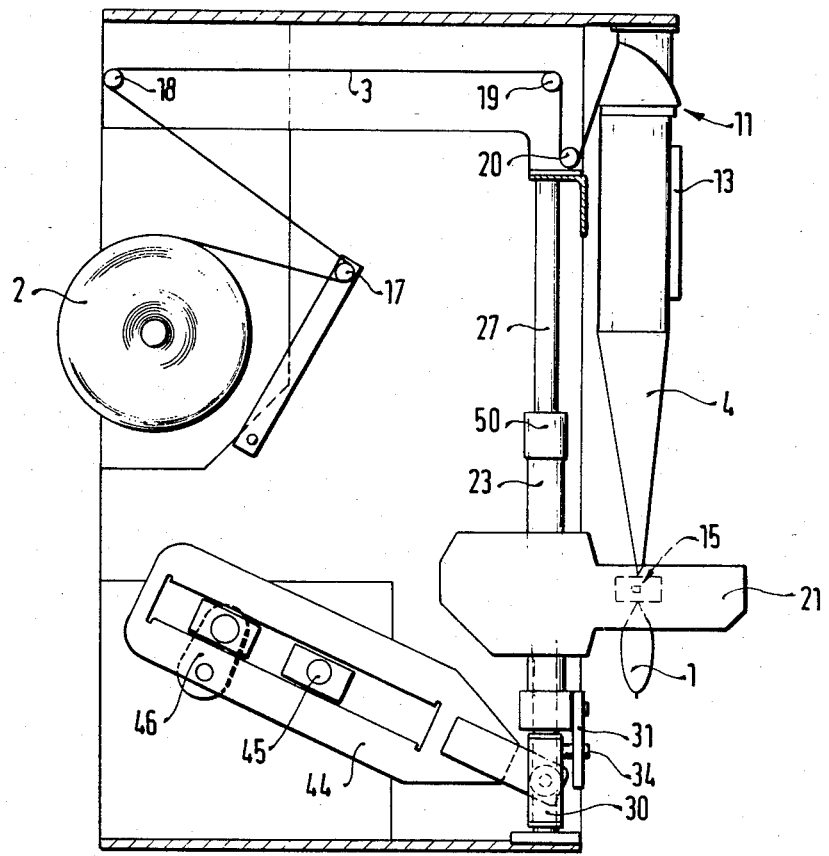
FIG. 2 shows the tubular pouch making apparatus of FIG. 1 in cross section in the plane II-II of FIG. 1.

In a machine frame 10 of symmetrical design, two tube shapers 11, 12 and longitudinal seam welding jaws 13, 14 are disposed parallel with and beside one another. Respective crosswise closure devices 15, 16 are movable up and down below the tube shapers 11, 12 and are axially extended relative thereto. Strips of packaging material 3 are delivered from supply rolls 2 via guide rollers 17–20 to the tube shapers 11, 12, which reshape the strips of packaging materials 3 into tubes 4. In their top dead center position, the crosswise closure devices 15, 16, which are movable up and down in increments, each engage a respective lower section of the tubes 4, press them together and pull the tubes 4 downward by one length of one pouch at a time. In the lower sections of the tubes, which are filled with a product, they thereby form a top seam and above it a bottom seam. By making a severing cut between these two seams, one finished pouch package 1 is released on each side.

Each of the two crosswise closure devices 15, 16 is disposed on its own carrier 21, 22. The two carriers 21, 22 are secured toward the middle of the machine frame 10, each on its own guide sheath 23, 24, and are directed outward in a straight guide 25, 26. Each guide sheath 23, 24 is supported such that it is displaceable up and down on parallel vertically disposed, stationary guide rod 27, 28. Below the two guide sheaths 23, 24, a carriage 30 is supported on the guide rods 27, 28 such that it is displaceable up and down.

To couple one of the carriers 21, 22 at a in common to the carriage 30 movable up and down, respective latches 31, 32 are pivotably supported on the lower end of each guide sheath 23, 24. The latches 31, 32 for each separate carrier have a recess 33, with which they are capable of surrounding and engaging tangs 34, 35 on the carriage 30. To keep the latches 31, 32 in engagement with the tangs 34, 35 of the carriage 30, tension springs 41, 42 are fastened to both latches 31, 32 and to arms 36, which project downward at the lower end of the guide sheaths 23, 24. Tang 34 drives carrier 21 and tang 35 drives carrier 22. As shown in FIG. 1 carrier 22 is disconnected from tang 35 and shown its upmost position.

To release the latches 31, 32 from the carriage 30 that is moved up and down, a one-way-action pneumatic working cylinder 37, 38 is disposed on each of the arms 36, its piston rods 39, 40 being articulated on the associated latches 31, 32. The carriage 30 is articulated on one end of a rocker arm 44, which is pivotably supported about a pivot point 45 and is set into incremental up-and-down motion in a vertical plane by a crank mechanism 46; when the two latches 31, 32 have latched onto the tangs 34, 35 of the carriage 30, the two carriers 21, 22 are each moved up and down by one length of a pouch package.

In the event of a malfunction or interruption in one of the two tubular pouch shaping devices, the associated carrier 21 or 22 can be stopped, without having to stop the carrier of the other tubular pouch shaping device. This is accomplished by putting compressed air into the associated working cylinder 37 or 38 via valves that are not shown. The release of the drive connection by pivoting the latch 31 or 32 in order to disengage their recess 33 from the associated tang 34 or 35 on the carriage 30 can however be accomplished only in the top dead center position of the carriage 30 (FIG. 1, right-hand side).

In order to keep the carrier in the upper position and to reinforce the upward movement of the carriers 21, 22 during each stroke, the guide sheaths 23, 24 and the stationary guide rods 27, 28 are embodied as one-way-acting pneumatic working cylinders. To this end, the guide rods 27, 28 each have a piston 48, 49 approximately at their center, the diameter of which piston 48, 49 corresponds to the inside width of the guide sheaths 23, 24, and the guide sheaths 23, 24 have an upper cylinder head 50, 51, which slides on the upper portion of the guide rods 27, 28. A transverse bore 52, 53 discharges slightly above the pistons 48, 49, and each bore 52, 53 can be made to communicate via respective longitudinal bores 54, 55 in the upper portion of the guide rods 27, 28 and a flexible hose 56, 57 with a supply of compressed air. Valves, not shown, are also incorporated into the compressed air supply line, and at bottom dead center of the carriage 30 they are opened, while at top dead center thereof they are closed again. When the valves open, compressed air flows into the guide sheaths 23, 24 and forces them upward. This compressed-air drive reinforces the mechanical drive of the crank mechanism 46 and the rocker arm 44 in lifting the carriers 21, 22; however, the course of movement is determined by the mechanical drive means. To permit precise fixation of the upper position of a carrier 21, 22 that has been uncoupled from the drive mechanism, which [fixation]is very important in effecting recoupling by means of the latches 31, 32, adjustable stop screws 60, 61 for the guide sheaths 23, 24 are located on an upper cross bar 58 of the machine frame 10.

The shutdown of one of the two carriers 21, 22 is maintained until such time as the associated switching valve is reversed once again. The instant of valve actuation may be arbitrary, because a means of control dependent on the primary drive mechanism assures that the coupling or uncoupling of a carrier 21, 22 to the carriage 30 takes place only in the top dead center position.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for simultaneously producing pairs of pouch packages from two separate tubes of packaging material, said apparatus having two separate independent operating tubular shaping devices vertically disposed beside one another and having two separate crosswise closure devices incrementally advancing said two tubes of packaging material by the length of one pouch at a time, which devices in an upper position engage the respective tubes of material and in a lower position sever one pouch package at a time from each separate tube of material, and which each said device is moved incrementally up and down by means of a common drive mechanism, in which each said crosswise closure device is disposed on a separate carrier, and that each said carrier is arranged to be removably coupled with a common reciprocating element which is moved up and down by the drive mechanism to form two pouches at the same time.

2. An apparatus as defined by claim 1, in which the carriers are separable connectable with the reciprocating element by means of respective positively engaging coupling members.

3. An apparatus as defined by claim 2, in which the coupling members take the form of a latch.

4. An apparatus as defined by claim 3, in which each latch is actuatable by means of separate fluid-operated working cylinders.

5. An apaparatus as defined by claim 4, in which the working cylinders are actuatable only in the upper position of the reciprocating element.

6. An apparatus as defined by claim 1, in which the reciprocating element is slidingly guided on two parallel guide rods, and each of which has a piston for guide sheaths embodied as fluid-operated working cylinders, which are each firmly connected with one of the carriers of the crosswise closure devices.

7. An apparatus as defined by claim 2, in which the reciprocating element is slidingly guided on two parallel guide rods, and each of which has a piston for guide sheaths embodied as fluid-operated working cylinders, which are each firmly connected with one of the carriers of the crosswise closure devices.

8. An apparatus as defined by claim 3, in which the reciprocating element is slidingly guided on two parallel guide rods, and each of which has a piston for guide sheaths embodied as fluid-operated working cylinders, which are each firmly connected with one of the carriers of the crosswise closure devices.

9. An apparatus as defined by claim 4, in which the reciprocating element is slidingly guided on two parallel guide rods, and each of which has a piston for guide sheaths embodied as fluid-operated working cylinders, which are each firmly connected with one of the carriers of the crosswise closure devices.

10. An apparatus as defined by claim 5, in which the reciprocating element is slidingly guided on two parallel guide rods, and each of which has a piston for guide sheaths embodied as fluid-operated working cylinders, which are each firmly connected with one of the carriers of the crosswise closure devices.

* * * * *